United States Patent
Chalabi et al.

(10) Patent No.: US 9,920,928 B2
(45) Date of Patent: Mar. 20, 2018

(54) WASTE PROCESSING

(71) Applicant: Chinook End-Stage Recycling Limited, Nottingham (GB)

(72) Inventors: Rifat Al Chalabi, Nottingham (GB); Ophneil Henry Perry, Nottingham (GB); John Turner, Nottingham (GB); Stevan Tiepo, Nottingham (GB)

(73) Assignee: Chinook End-Stage Recycling Limited, Nottingham (GB)

( * ) Notice: Subject to any disclaimer, the term of this patent is extended or adjusted under 35 U.S.C. 154(b) by 124 days.

(21) Appl. No.: 14/767,443

(22) PCT Filed: Feb. 11, 2014

(86) PCT No.: PCT/GB2014/050395
§ 371 (c)(1),
(2) Date: Aug. 12, 2015

(87) PCT Pub. No.: WO2014/125263
PCT Pub. Date: Aug. 21, 2014

(65) Prior Publication Data
US 2015/0377482 A1  Dec. 31, 2015

(30) Foreign Application Priority Data
Feb. 12, 2013  (GB) .................... 1302457.5

(51) Int. Cl.
| | | |
|---|---|---|
| *F23G 5/027* | (2006.01) | |
| *C10J 3/82* | (2006.01) | |
| *F01K 7/16* | (2006.01) | |
| *C10J 3/04* | (2006.01) | |
| *C10J 3/72* | (2006.01) | |
| *C22B 21/00* | (2006.01) | |
| *F23G 5/46* | (2006.01) | |
| *F23G 5/50* | (2006.01) | |
| *F23G 5/38* | (2006.01) | |

(52) U.S. Cl.
CPC ............... *F23G 5/027* (2013.01); *C10J 3/04* (2013.01); *C10J 3/721* (2013.01); *C10J 3/723* (2013.01);
(Continued)

(58) Field of Classification Search
CPC ... F23G 5/027; F23G 5/38; F23G 5/50; F23G 5/0276; F23G 5/46; F23G 2900/50001;
(Continued)

(56) References Cited

U.S. PATENT DOCUMENTS

| | | | |
|---|---|---|---|
| 5,364,443 A | 11/1994 | Tremblay et al. | |
| 6,024,226 A * | 2/2000 | Olivier ............... | B03B 5/30 209/172.5 |

(Continued)

FOREIGN PATENT DOCUMENTS

| | | |
|---|---|---|
| CN | 101617170 | 12/2009 |
| CN | 101715532 | 5/2010 |

(Continued)

OTHER PUBLICATIONS

WO PCT/GB2014/050395 Search Rept., dated Apr. 23, 2014, Chinook End-Stage Recycling.
(Continued)

*Primary Examiner* — Hoang Nguyen
(74) *Attorney, Agent, or Firm* — Wells St. John P.S.

(57) ABSTRACT

This invention provides a system (10) for generating energy from waste material. The system comprises a first batch processing oven (12) for generating syngas and a second batch processing oven (14) for generating syngas. At least one thermal treatment chamber (20) heats the syngas after it is produced, and an energy converter (22) converts energy from the syngas to electrical energy.

19 Claims, 4 Drawing Sheets

(52) U.S. Cl.
CPC .............. *C10J 3/82* (2013.01); *C22B 21/0007* (2013.01); *F01K 7/16* (2013.01); *F23G 5/0276* (2013.01); *F23G 5/38* (2013.01); *F23G 5/46* (2013.01); *F23G 5/50* (2013.01); *C10J 2300/0916* (2013.01); *C10J 2300/0946* (2013.01); *C10J 2300/1643* (2013.01); *C10J 2300/1687* (2013.01); *C10J 2300/183* (2013.01); *F23G 2201/303* (2013.01); *F23G 2201/40* (2013.01); *F23G 2207/104* (2013.01); *F23G 2900/50001* (2013.01); *Y02E 20/12* (2013.01); *Y02P 20/129* (2015.11)

(58) Field of Classification Search
CPC ......... F23G 2201/303; F23G 2207/104; F23G 2201/40; F01K 7/16; C10J 3/82; C10J 3/04; C10J 3/721; C10J 3/723; C10J 2300/1643; C10J 2300/0946; C10J 2300/0916; C10J 2300/1687; C10J 2300/183; C22B 21/0007; Y02P 20/129; Y02E 20/12
USPC .................... 60/645, 670; 110/235, 251–253
See application file for complete search history.

(56) References Cited

U.S. PATENT DOCUMENTS

| | | | |
|---|---|---|---|
| 8,578,869 B2 | 11/2013 | Meng | |
| 8,607,717 B2 | 12/2013 | Einarsson | |
| 9,370,808 B2* | 6/2016 | Chalabi | B09B 3/00 |
| 2004/0031424 A1 | 2/2004 | Pope | |
| 2007/0266632 A1 | 11/2007 | Tsangaris et al. | |
| 2010/0139287 A1* | 6/2010 | Kramer | C10B 15/02 |
| | | | 60/781 |
| 2010/0199895 A1 | 8/2010 | Einarsson | |
| 2010/0224109 A1 | 9/2010 | Meng | |
| 2012/0298020 A1 | 11/2012 | Chalabi et al. | |
| 2013/0248767 A1* | 9/2013 | Ampulski | B01J 8/087 |
| | | | 252/373 |
| 2014/0053686 A1* | 2/2014 | Metius | C21B 5/001 |
| | | | 75/488 |
| 2014/0215921 A1 | 8/2014 | Chalabi et al. | |

FOREIGN PATENT DOCUMENTS

| | | |
|---|---|---|
| CN | 102585905 | 7/2012 |
| CN | 102656406 | 9/2012 |
| CN | 201480020673.1 | 1/2017 |
| GB | 2470127 | 11/2010 |
| GB | 2492097 | 12/2012 |
| GB | 1302457.5 | 4/2013 |
| KR | 10-2011-0010447 | 2/2011 |
| KR | 10-2015-7024769 | 9/2016 |
| WO | WO 2008/068781 | 6/2008 |
| WO | WO 2008/122896 | 10/2008 |
| WO | WO PCT/GB2014/050395 | 8/2015 |

OTHER PUBLICATIONS

WO PCT/GB2014/050395 Writ. Opin., dated Apr. 23, 2014, Chinook End-Stage Recycling.

* cited by examiner

WASTE PROCESSING

CROSS REFERENCE TO RELATED APPLICATION

This application is a 35 U.S.C § 371 of claims priority to PCT International Application No. PCT/GB2014/050395 which was filed on 11 Feb. 2014, and was published in English, and claims priority to GB Patent Application No. 1302457.5, which was filed on 12 Feb. 2013, the teaching of which are incorporated herein by reference.

The present invention relates to waste processing and particularly to a system and method for generating energy from waste material.

The present invention relates to an apparatus for processing waste material including organic waste and municipal solid waste (MSW). In particular the invention relates to apparatus and a method for thermally removing coatings and/or impurities from materials which are particularly suited to batch processing of materials.

BACKGROUND OF THE INVENTION

Gasification is a process that converts carbonaceous materials, such as biomass, into carbon monoxide and hydrogen by reacting the raw material at high temperatures with a controlled amount of oxygen. The resulting gas mixture is called synthesis gas or syngas. Synthetic gas is made predominately of CO (carbon Monoxide), and Hydrogen. These two elements are the basic building blocks for the Alcohols (Methanol, Ethanol, Propanol, etc.).

Gasification is an efficient method for extracting energy from many different types of organic materials and provides clean waste disposal. Gasification is more efficient than direct combustion of the original fuel, particularly since more of the organics contained in the processed material is converted into energy (higher thermal efficiency).

Pyrolysis is a similar process to gasification and which also produces synthetic gas, but in which zero or substantially zero oxygen is present.

Syngas may be burned directly in internal combustion engines or used to produce alcohols such as methanol, ethanol and propanol, and also hydrogen. Syngas made by gasification and pyrolysis of fossil fuels is currently widely used on industrial scales to generate electricity.

There is an increasing requirement to recycle materials such as aluminium, magnesium and other metals and non-metals. Often such materials will be coated in paint, oil, water, lacquers, plastics, or other volatile organic compounds (V.O.C.s) which must be removed prior to re-melting the materials. For materials which are capable of being processed at relatively high temperatures without melting, such impurities are typically removed using a thermal process which is sometimes known as de-coating. Such thermal de-coating processes can also be used to dry and/or sterilize materials prior to remelting.

For example, aluminium is often used in the production of beverage cans which are typically coated in paint, lacquers and/or other V.O.C.s. Before used beverage cans (U.B.C.s) or scrap material produced during the manufacture of beverage cans can be melted down for recycling, any coatings or other impurities must be removed in order to minimize metal loss.

Thermal de-coating, however, is not limited to application to aluminium but can be used to clean or purify any metal or non-metallic materials which are capable of withstanding the temperatures present in the thermal de-coating process. Thermal de-coating can be used to de-coat or purify magnesium or magnesium alloys for example. In particular the process can be used for treating municipal waste so as to recover metal therefrom.

Known thermal de-coating processes involve exposing the material to be treated to hot gases in order to oxidise the coatings and/or impurities which are to be removed. This exposure takes place in a closed environment in which the temperature and oxygen content of the hot gases can be controlled. Temperatures in excess of 300° C. are required to remove most organic compounds and an oxygen level in the range of 6% to 12% is normally required.

If the temperature and oxygen levels of the hot gases are not carefully controlled the process can go autothermic as the V.O.C.s which are released during the thermal stripping are combusted. This can result in an uncontrolled increase in the temperature of the hot gases which may be very dangerous.

The material will usually be shredded before treatment and it is important for effective de-coating that all the surfaces of the shredded material are exposed to the hot gases. If this does not occur then the treatment becomes less effective and, in the case of U.B.C.s in particular, a black stain may be left on the surface of the treated material. It is also desirable for the material to be agitated during the treatment to physically remove lose coatings or impurities from the material.

At present there are two known types of thermal de-coating, these being continuous process and batch process.

Continuous process is good for large volumes of substantially constant material that enables steady state process conditions and batch process is beneficial where either low volumes are being processed or where there is a large variation in the type of material to be processed, e.g. calorific content, water content etc.

One problem with the batch process is that, while it enables great flexibility in the processing cycle by allowing process variation between batches, the batch process does not produce a steady rate of syngas, in particular at the beginning and at the end of the cycle where there is a ramp up and a ramp down of syngas production.

There are a couple of problems associated with this. Firstly, syngas is normally treated in a thermal oxidiser after production to combust it, and the hot exhaust gasses are then often used for power generation, e.g. to power a boiler. As there is cyclic fluctuation in the syngas production rate the thermal oxidiser must be sized to accommodate maximum syngas production and is therefore under utilised for much of the cycle. Further more, during the lower syngas production part of the cycle virgin fuel, often natural gas, is needed to maintain the oxidiser at the required temperature to destroy the syngas for environmental purposes. This use of virgin fuel reduces the overall efficiency and cost effectiveness of the process.

In alternative methods the syngas is heated to remove any hydrocarbons therein, is cleaned and is then combusted in a syngas engine to directly drive a generator. Such syngas engines are not well suited to cyclic use and are most efficient when operated at steady process parameters.

The present invention seeks to provide an improved apparatus for processing waste material.

Accordingly, the present invention provides a system for generating energy from waste material comprising: a first batch processing oven for generating syngas; a second batch processing oven for generating syngas; a thermal treatment chamber for heating the syngas and an energy converter for converting energy from the syngas to electrical energy.

In one embodiment the thermal treatment chamber includes one or more burners for burning said syngas; the energy convertor includes a heat recovery means for recovering heat from the burning gases. In another arrangement the thermal treatment chamber includes one or more burners for heating said syngas without combusting it, and the energy converter comprises a syngas engine.

In a preferred embodiment of the invention the system further comprises third and optionally a fourth batch processing oven for generating syngas.

In a preferred embodiment of the invention the system further comprises control means for controlling the supply of syngas from said first and second batch processing ovens to the thermal treatment chamber in dependence on at least one operating parameter of said apparatus, thereby to ensure a substantially constant supply of syngas to said thermal treatment chamber.

Each batch processing oven may be provided with its own burner in the thermal treatment chamber.

Advantageously, the or one of the operating parameters is the content of carbon monoxide in said syngas.

The control means is preferably operable to control the supply of syngas from one batch processing oven to the thermal treatment chamber while at least one of the other batch processing ovens is being emptied and refilled.

The control means is operable to control the batch processing ovens so that, as the syngas production rate from one oven starts to reduce towards the end of its cycle the flow of syngas to the thermal treatment chamber can be supplemented by syngas produced from a another oven so as to achieve a substantially constant flow rate of syngas to the thermal treatment chamber. More preferably the reduction in syngas at the end of one cycle is supplemented by an increase in the syngas from the start of the cycle of another oven. More preferably as the cycle of one oven substantially comes to an end the cycle of another oven substantially reaches maximum production.

The first and second, and optionally third and fourth, batch processing ovens may be coupled to said thermal treatment chamber by conduit means for supplying said syngas to said thermal treatment chamber; and valve means are provided in said conduit means for controlling the flow of syngas to said thermal treatment chamber.

Where the syngas is combusted in the thermal treatment chamber the syngas may enter the thermal treatment chamber via a burner, together with sufficient oxygen to combust the syngas.

Where the syngas is heated in the thermal treatment chamber without being combusted the thermal treatment chamber may be provided with a source of fuel and oxygen in a stoichiometric ratio such that, after combustion there is no excess oxygen in the thermal treatment chamber, thereby preventing the combustion of the syngas therein The thermal treatment chamber may be a thermal oxidiser and the heat recovery means may conveniently be a waste heat recovery boiler for generating dry saturated steam. The steam generated may drive a turbine.

The present invention also provides a method for generating energy from waste material comprising: providing: a thermal treatment chamber for heating said syngas; and providing an energy converter for converting energy from the syngas to electrical energy; the method further comprising; generating syngas in a first batch processing oven; generating syngas in at least a second batch processing oven; and controlling the flow of syngas from said first and at least second batch processing ovens to said thermal treatment chamber in dependence on at least one operating parameter, thereby to ensure a substantially constant supply of syngas to said thermal treatment chamber.

In a preferred method according to the invention the or one of the operating parameters is the content of carbon monoxide in said syngas.

In a preferred method according to the invention the control means controls the supply of syngas from one batch processing oven while at least one of the other batch processing ovens is being emptied and refilled.

The method may include controlling the batch processing ovens so that, as the syngas production rate from one oven starts to reduce towards the end of its cycle the flow of syngas to the thermal treatment chamber is supplemented by syngas produced from another oven so as to achieve a substantially constant flow rate of syngas to the thermal treatment chamber.

The method preferably includes controlling the start times of the cycles of different ovens so that the reduction in syngas at the end of one cycle is supplemented by an increase in the syngas from the start of the cycle of another oven. More preferably the method includes controlling the start times of the cycles of different ovens so that as the cycle of one oven substantially comes to an end, the cycle of another oven substantially reaches maximum production.

Advantageously, steam generating means are provided for generating steam for driving a turbine.

The present invention is further described hereinafter, by way of example, with reference to the accompanying drawings, in which.

Figure 1:
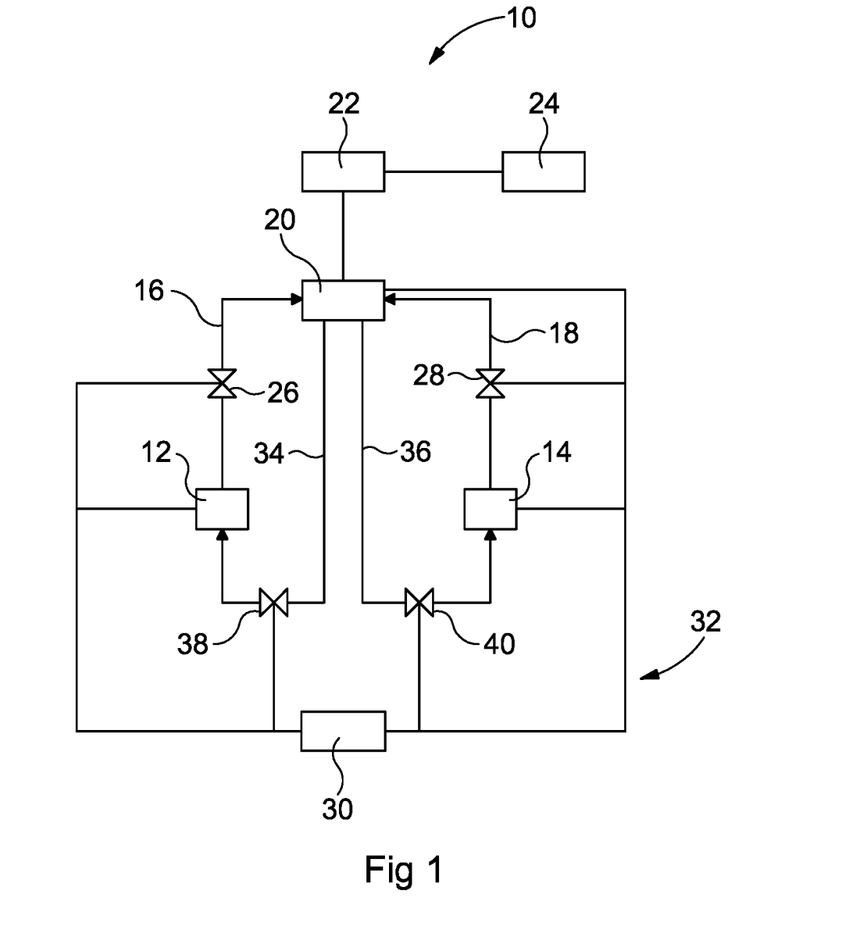
FIG. 1 is a schematic diagram of a preferred form of system according to the present invention.

Referring firstly to FIG. 1, this shows a system 10 for generating energy from waste material. The energy is conveniently used for driving, for example, a turbine 24 to generate electricity.

The system 10 comprises first and second batch processing ovens 12, 14. Each of these ovens is a batch processing oven for processing waste material, including organic waste and municipal solid waste (MCW) and for thermally removing coatings and/or impurities from materials which are particularly suited to batch processing.

The ovens convert carbonaceous materials, such as biomass, into carbon monoxide (CO) and hydrogen by reacting the raw material at high temperatures with a controlled amount of oxygen. The resulting synthetic gas mixture (Syngas) is made predominantly of CO and hydrogen. These types of ovens are well known and are not described further here.

Each of the ovens is coupled through conduit means 16, 18 in the form of piping to a thermal treatment chamber 20, containing a burner, which in this embodiment is a thermal oxidiser.

The thermal oxidiser burns the Syngas to generate carbon dioxide ($CO_2$), water ($H_2O$) and oxygen ($O_2$) which is passed to a heat recovery means 22, which converts the heat generated into steam. The heat recovery means 22 is conveniently a waste heat recovery boiler, which preferably generates dry saturated steam for further processing. In the preferred embodiment, the steam is applied to the turbine 24 in order to generate electricity. However, it will be appreciated that the energy generated by the thermal oxidiser 20 can be used for any suitable purpose, including, but not limited to, the provision of hot water or building heating.

The flow of Syngas from the ovens 12, 14 to the thermal oxidiser 20 is controlled by valves 26, 28 in the piping 16, 18. These valves are in turn controlled by a control unit 30 to control the flow of Syngas from each of the ovens 12, 14 to the thermal oxidiser 20. The control unit forms part of a control system 32 which includes the valves 26, 28.

The control unit 30 monitors one or more parameters of the system and controls the valves 26, 28 in dependence on the measured parameter. It also preferably controls the burner of the thermal oxidiser 20 in dependence on one or more of the measured parameters.

The control system 32 includes one or more sensors for monitoring the system operating parameters. The parameters which are monitored by the control system may include the temperature, quality and gas content (such as CO content) of the Syngas in one or more of the ovens 12, 14, the piping 16, 18 and the thermal oxidiser 20 and at the outlets of these. The control system 32 also measures the energy level at the output from the heat recovery boiler 22.

Figure 2:
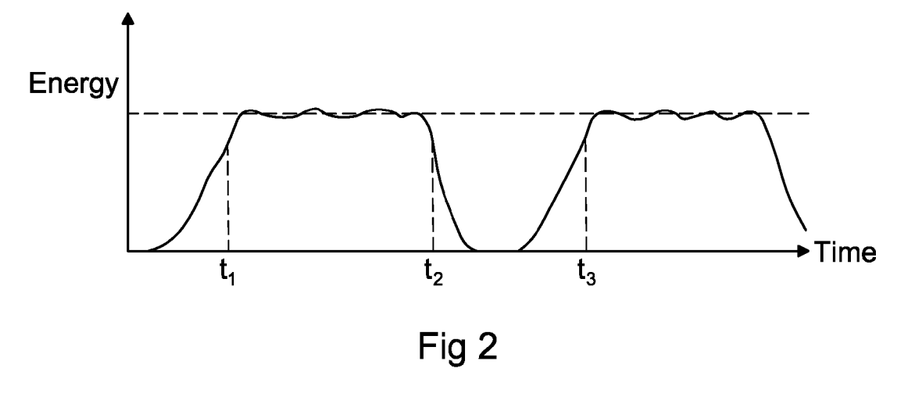
FIG. 2 is a graph showing the generation of energy against time from a conventional system.

In known systems, a single batch processing oven is used and the graph of FIG. 2 shows the energy produced by the known system over time. As can be seen from FIG. 2, on initial firing up of the oven, there is a significant time lag $t_1$ before the oven is producing sufficient quantities of Syngas and therefore enabling the generation of the required energy. As processing of the waste material in the oven continues and most of the waste material has been processed the amount of Syngas produced and hence the energy generated, starts to fall off at $t_2$. There is, then, a significant time lag whilst the processed waste is removed from the oven, the oven recharged with new waste and the process recommenced, before the syngas and energy levels generated by the new batch reaches a reasonable level at $t_3$.

The system of FIG. 1 according to the present invention uses two batch processing ovens 12, 14, which generate and supply Syngas generally alternately to the thermal oxidiser 20. When one oven nears completion of the processing of its batch of waste material and is powered down for removal of the waste and recharging, the other oven is used to make up the balance of Syngas and energy generated We refer now to FIG. 3. If we assume that, on initial firing up, oven 12 is used, there is the same, initial time lag $t_1$ for the oven 12 to generate a reasonable level of Syngas for use by the thermal oxidiser 20. From $t_1$ onwards the Syngas is generated by the oven 12 and the valve 28 is normally closed.

In the applicant's system, the control system 32 can control the flow of Syngas from the ovens 12, 14 generally alternately, with some overlap, to ensure that a reasonably steady supply of Syngas is provided to the thermal oxidiser 20 and a steady energy level is generated. This reduces or eliminates the down time between times $t_2$ and $t_3$ of FIG. 2.

In the applicant's system, on initial commissioning of the system, let us assume that the oven 12 is first fired up to generate Syngas. The amount of gas generated and thus the energy produced will follow curve 12 of FIG. 3. However, at time $t_4$ before the flow of Syngas from oven 12 begins to diminish, oven 14 is fired up, such that by the time the Syngas from oven 12 begins to decline ($t_5$) the oven 14 is fully fired up and producing Syngas at the required level. Thus, the control system 32 can be programmed to open valve 28 at a pre-selected time, say $t_6$, in order to allow Syngas from oven 14 to be supplied to the thermal oxidiser 20. Valve 26 can then be closed. This cycle is repeated when the flow of Syngas from oven 14 begins to diminish. The level of Syngas and therefore energy generated is thus maintained relatively constant.

Figure 3:
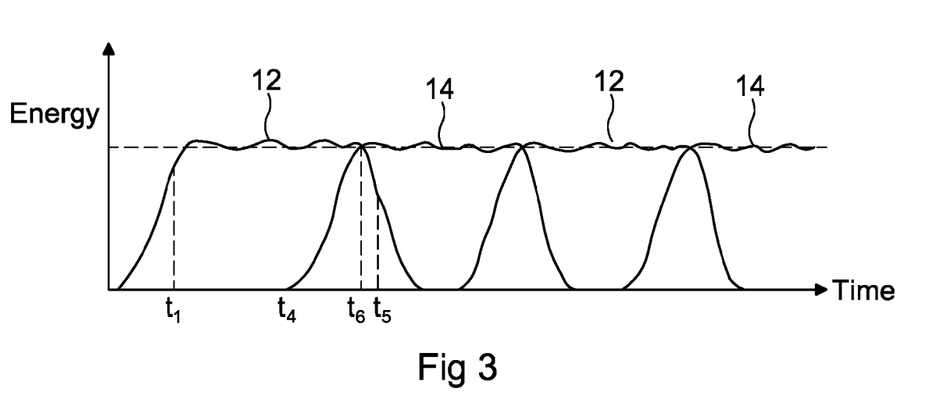
FIG. 3 shows the generation of energy against time for the system of FIG. 1.

The control system 32 monitors the quality of Syngas produced by the two ovens 12, 14 and typically monitors the amount of CO in the Syngas supplied to the thermal oxidiser 20. When the monitoring of the Syngas from oven 12 indicates that the quantity or quality of Syngas produced by oven 12 has dropped below a pre-selected level ($t_5$) valve 26 can be closed, the processed waste in oven 12 can be removed and a further batch of waste for processing added to oven 12. Oven 12 can then be fired up ready to supply Syngas to the thermal oxidiser 20. Again, after a pre-selected time period, the control system 32 can open valve 26 to allow the Syngas from oven 12 to be supplied to the thermal oxidiser 20. Once the quality or quantity of Syngas from oven 14 drops below a pre-selected level, valve 28 can be closed and the processed waste from oven 14 can be removed. The oven 14 is then replenished with waste ready to take over from oven 14 in supplying Syngas to the thermal oxidiser 20.

The control system 32 can also provide a visual and/or audible warning to an operator when one or more of the operating parameters monitored by the system 32 falls outside a preselected range or value. For example, the control system 32 can provide a visual and/or audible warning when the quality and/or quantity of Syngas produced by one of the ovens 12, 14 indicates that the processing of the waste material in the oven is close to being completed.

As will be appreciated, the switching between ovens 12, 14 enables a substantially constant flow of Syngas to be provided to the thermal oxidiser 20 and consequently a substantially constant amount of energy to be generated.

The burner 20 is also coupled to each of the ovens 12, 14 through further conduit means 34, 36 in the form of piping which allow the return flow of gases from the burner 20 to the ovens 12, 14. The return flow of gases to the ovens 12, 14 is controlled by valves 38, 40 in the piping 34, 36. These valves are in turn controlled by the control system 32 in dependence on one or more of the monitored operating parameters of the system. This return flow of gases can be useful in heating the gases and waste material in the ovens and in controlling the quality of gases in the burner 20.

Figure 4:
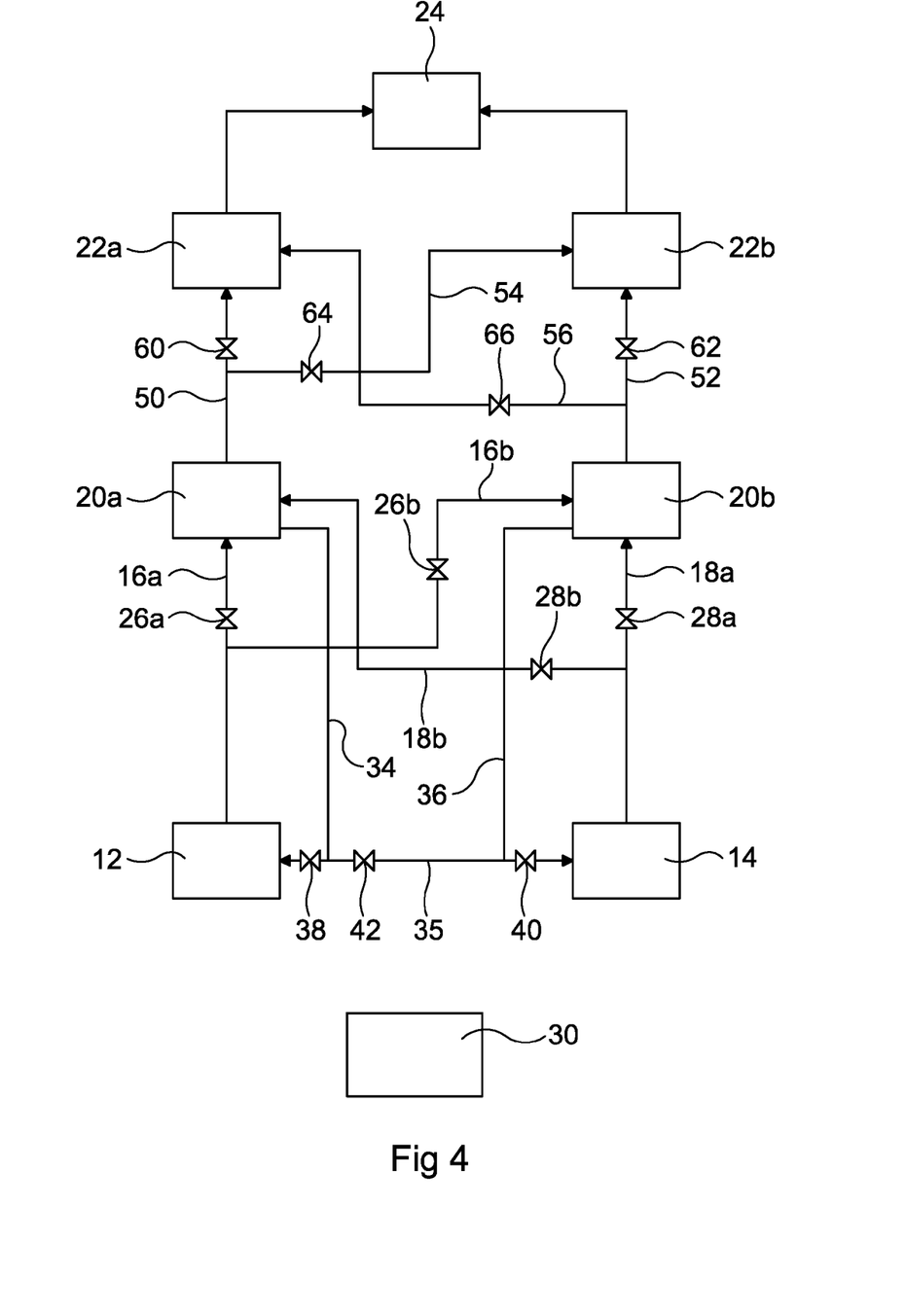
FIG. 4 is a schematic diagram of a second embodiment of the system according to the present invention.

Referring now to FIG. 4, this shows a modification to the system of FIG. 1 with like parts having like numbers.

The system of FIG. 4 operates in a similar manner to that of FIG. 1. However, in FIG. 4 there are two thermal oxidisers 20a, 20b and to heat recovery means 22a, 22b, which feed a common turbine 24.

Each of the ovens 12, 14 has conduit means 16a, 16b, 18a, 18b in the form of piping to each of the thermal oxidisers 20a, 20b with the piping being controlled by valves 26a, 26b, 28a, 28b. Each thermal oxidiser 20a, 20b has return piping 34, 36, which connect to both ovens 12, 14 via conduit means 35. The return flows of gases are controlled by signal valves 38, 40 and 42. Each of the thermal oxidisers 20a, 20b is, in turn, coupled to both of the heat recovery means 22a, 22b by suitable means in the form of piping 50, 52, 54, 56, which are in turn controlled by valves 60 to 66. All of the valves of the system are controlled by the control system 32 and control unit 30 to ensure a substantially constant supply of energy from the turbine 24.

It will be appreciated that any suitable combination of thermal oxidisers 20 and heat recovery means 22 may be provided. For example, one thermal oxidiser and two or more heat recovery units 22 may be provided or one heat recovery means 22 and two or more thermal oxidisers 20 with suitably interconnecting piping and valves to control the flow of gases.

In addition, more than two ovens 12, 14 may be provided and again the system may have any combination of members of ovens 12, 14, thermal oxidisers 20, heat recovery means 22 and turbines 24. It will, of course, be appreciated that more than one turbine 24 may be provided.

Regardless of the combination of ovens, thermal oxidisers, heat recovery means and turbines, the system will include a suitable arrangement of piping and valves to enable the control system to control the flow of gases between the ovens, thermal oxidisers and heat recovery means.

It will also be appreciated that whilst the heat recovery means 22 has been described above as a waste heat recovery boiler it will be appreciated that a variety of different heat recovery means may be used in the system of FIG. 4 where more than one heat recovery means is provided.

In a typical process, the control system monitors the various operating parameters of the burners 20 to compare these with desired values. If the comparison indicates that there is a problem with a particular burner 20, such as a fall in the quantity of $O_2$ issued by the burner, the control system adjusts the burner operating parameters and/or the gases passed to the burner from the associated oven to bring the level back to normal. However, if the level does not return to normal this indicates that the waste in the associated oven has been fully processed and the oven is then recharged with new waste material.

The control system also monitors the energy level output from the or each heat recovery boiler 22. If this falls then the system adjusts the operation of the boiler to bring the level back to the desired level.

Figure 5:
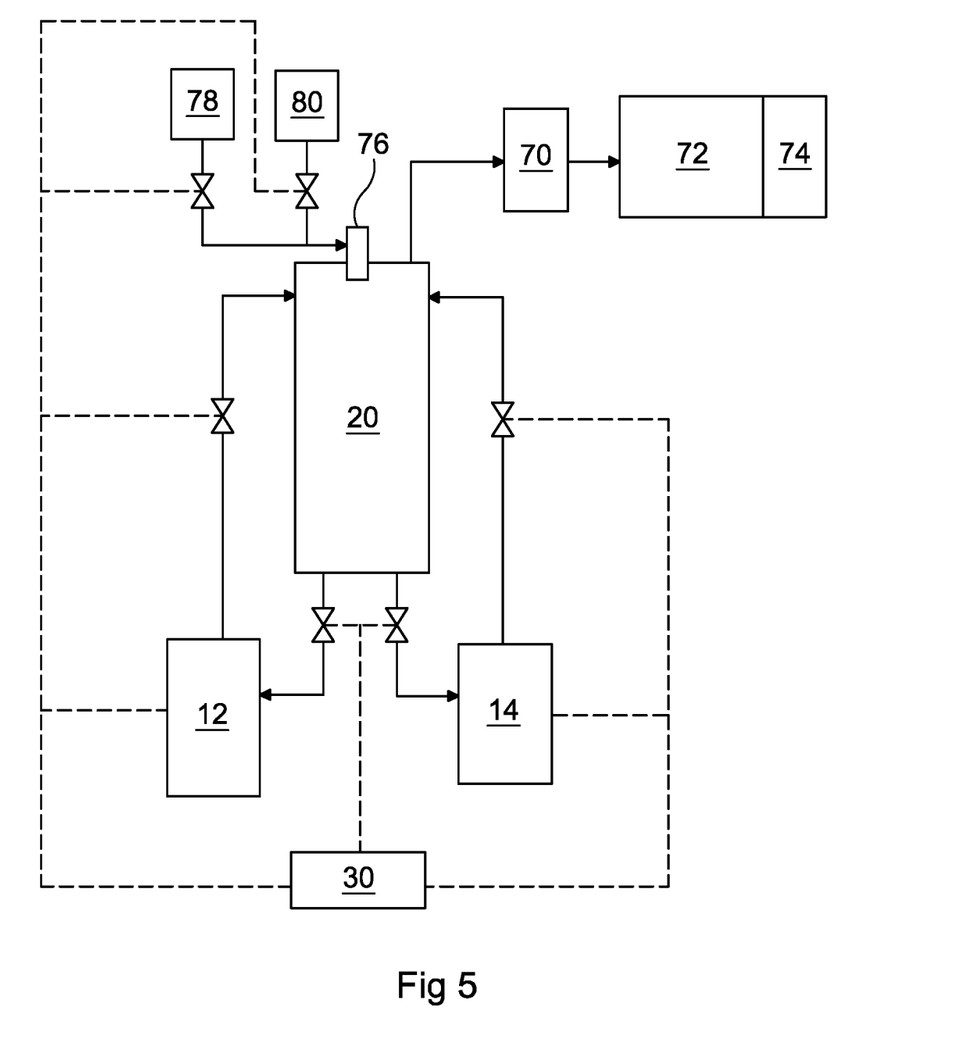
FIG. 5 is a schematic diagram of a third embodiment of the system according to the present invention.

FIG. 5 shows an alternative embodiment in which the thermal treatment chamber 20 does not combust the syngas but instead heats it to break down any long chain hydrocarbons or VOC's in the gas to produce a clean source of syngas. The syngas is then passed through a filter 70 (and optionally cooled) prior to being combusted in a syngas engine 72 which drives a generator 74 to produce electricity. In this case the thermal treatment chamber 20 is provided with a burner 76 which is supplied with oxygen 78 and fuel 80 in a stoichiometric ration sufficient for the combustion of the fuel 80. In this manner the syngas is heated therein but there is no excess oxygen in the thermal treatment chamber 20 to permit combustion of the syngas. The burner 76 raises the temperature of the syngas so as to break down any long chain hydrocarbons or VOC's therein.

In a further embodiment a third and possibly a fourth oven are used. As will be appreciated by the skilled person the foregoing discussion relating to the operation would apply irrespectively of the number of ovens being used. The benefit of using a third oven is that there are constantly two ovens producing syngas (or three ovens if a fourth oven is also used) thereby increasing the total production levels any small fluctuations in the syngas production rate, for example due to different ramp up and ramp down curves of the cycles, these fluctuations will represent a smaller percentage of the total instantaneous flow rate and will therefore result in a more steady syngas production rate.

It will be appreciated that the features of the embodiments described above are interchangeable and any feature of one embodiment may be utilised in any other embodiment.

The invention claimed is:

1. A system for generating energy from waste material comprising:
    a first batch processing oven for generating syngas;
    a second batch processing oven for generating syngas;
    at least one thermal treatment chamber for heating said syngas;
    the first and second batch processing ovens being connected in parallel to the at least one thermal treatment chamber;
    a control system configured to control the supply of syngas from said first and subsequent batch processing ovens generally alternately to the or each said thermal treatment chamber in dependence on at least one operating parameter, the control system configured to control the first and second batch processing ovens so that, as the syngas production rate from one oven starts to reduce towards the end of its cycle the flow of syngas to the at least one thermal treatment chamber is supplemented by syngas produced from another oven so as to achieve a substantially constant flow rate of syngas to the thermal treatment chamber;
    and an energy converter for converting energy from the syngas to electrical energy.

2. A system according to claim 1 wherein the thermal treatment chamber includes one or more burners for burning said syngas and the energy convertor includes a heat recovery unit configured to recover heat from the burning gases.

3. A system according to claim 1 wherein the thermal treatment chamber includes one or more burners for heating said syngas without combusting it, and the energy converter comprises a syngas engine.

4. A system as claimed in claim 1 further comprising a third or third and fourth batch processing oven for generating syngas.

5. A system as claimed in claim 1 wherein said operating parameter is the content of carbon monoxide in said syngas.

6. A system as claimed in claim 1 wherein the control system is operable to control the supply of syngas from one batch processing oven to the thermal treatment chamber while another batch processing oven is being emptied and refilled.

7. A system as claimed in claim 1 wherein the reduction in syngas at the end of the cycle of the first oven is supplemented by an increase in the syngas from the start of the cycle of a subsequent oven.

8. A system as claimed in claim 7 wherein, as the cycle of one oven substantially comes to an end, the cycle of a subsequent oven substantially reaches maximum production.

9. A system as claimed in claim 1 wherein:
    said first and subsequent batch processing ovens are coupled to the thermal treatment chamber by conduits configured to supply said syngas to the thermal treatment chamber;
    and valves are provided in said conduits, and the valves are configured to control the flow of syngas to the thermal treatment chamber.

10. A system as claimed in claim 1 wherein said energy converter comprises a heat recovery unit configured to generate steam for driving a turbine.

11. A system as claimed in claim 10 wherein said heat recovery unit is a waste heat recovery boiler for generating dry saturated steam.

12. A method for generating energy from waste material comprising:
    providing:
        a first batch processing oven;
        a second batch processing oven;
        at least one thermal treatment chamber;

the first and second batch processing ovens being connected in parallel to the at least one thermal treatment chamber;

and an energy convertor for converting energy from the syngas to electrical energy;

generating syngas by gasifying or pyrolysing organic containing material in the first batch processing oven;

generating syngas by gasifying or pyrolysing organic containing material in the second batch processing oven;

and controlling the flow of syngas from said first and second batch processing ovens generally alternately to the or each thermal treatment chamber in dependence on at least one operating parameter, comprising controlling the batch processing ovens so that, as the syngas production rate from one oven starts to reduce towards the end of its cycle the flow of syngas to the at least one thermal treatment chamber is supplemented by syngas produced from a subsequent oven so as to produce a substantially constant flow rate of syngas to the thermal treatment chamber.

13. A method as claimed in claim 12 further comprising:

generating syngas in a third or a third and fourth batch processing ovens; and controlling the flow of syngas from said third or a third and fourth batch processing oven to the thermal treatment chamber in dependence on said at least one operating parameter, thereby to ensure a substantially constant supply of syngas to the thermal treatment chamber.

14. A method as claimed in claim 12 wherein said operating parameter is the content of carbon monoxide in said syngas.

15. The method as claimed in claim 12 further comprising:

controlling the start time of the cycles of different ovens so that the reduction in the flow of syngas to the thermal treatment chamber at the end of one cycle is supplemented by an increase in the syngas from the start of the cycle of another oven.

16. The method as claimed in claim 12 wherein:

the increase in syngas production from a subsequent oven substantially equates to the reduction in syngas from the first oven.

17. The method as claimed in claim 15 further comprising controlling the start times of the cycles of different ovens so that as the cycle of one oven substantially comes to an end, the cycle of another oven substantially reaches maximum production.

18. A method as claimed in claim 12 further comprising combusting the syngas in the thermal treatment chamber and recovering the heat from the combustion gases to generate steam from the or each said burner for driving a turbine.

19. A method as claimed in claim 12 further comprising heating the syngas in the thermal treatment chamber in the absence of oxygen to break down any long chain hydrocarbons therein, and combusting said syngas in a syngas engine to drive a generator.

* * * * *